(12) United States Patent
Pelliccio et al.

(10) Patent No.: US 8,913,777 B2
(45) Date of Patent: Dec. 16, 2014

(54) PROVIDING SPEAKERS IN A VEHICLE SEAT

(71) Applicant: Bose Corporation, Framingham, MA (US)

(72) Inventors: John R. Pelliccio, Marlborough, MA (US); Jeffery R. Vautin, Worcester, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/760,134

(22) Filed: Feb. 6, 2013

(65) Prior Publication Data

US 2014/0219492 A1    Aug. 7, 2014

(51) Int. Cl.
| | | |
|---|---|---|
| *H04R 25/00* | (2006.01) | |
| *H04R 1/02* | (2006.01) | |
| *B60N 2/02* | (2006.01) | |
| *B60R 11/02* | (2006.01) | |
| *B60N 2/44* | (2006.01) | |
| *H04R 1/28* | (2006.01) | |
| *B60R 11/00* | (2006.01) | |

(52) U.S. Cl.
CPC .............. *H04R 1/025* (2013.01); *B60N 2/0232* (2013.01); *B60R 11/0217* (2013.01); *B60N 2/44* (2013.01); *H04R 1/026* (2013.01); *H04R 1/2803* (2013.01); *B60R 2011/0015* (2013.01); *B60N 2002/0236* (2013.01); *B60N 2002/024* (2013.01); *B60N 2002/445* (2013.01)
USPC ........................... 381/389; 381/86; 297/217.4

(58) Field of Classification Search
USPC ................... 381/86, 300–302, 386–389, 345; 297/217.4
See application file for complete search history.

(56) References Cited

U.S. PATENT DOCUMENTS

| 3,327,808 | A | * | 6/1967 | Shaper ........................... 181/153 |
| 4,490,842 | A | * | 12/1984 | Watanabe ........................ 381/86 |
| 5,082,084 | A | * | 1/1992 | Ye-Ming ....................... 181/153 |

(Continued)

FOREIGN PATENT DOCUMENTS

| DE | 3925995 A1 | 2/1991 |
| DE | 19534400 A1 | 3/1997 |

(Continued)

OTHER PUBLICATIONS

International Search Report and Written Opinion for International Application No. PCT/US2014/013865 dated May 27, 2014.

*Primary Examiner* — Davetta W Goins
*Assistant Examiner* — Phylesha Dabney (57) ABSTRACT

A speaker system for use in a seat includes a speaker enclosure including a speaker having a sound-radiating element with a first side and a second side, and an at least partially enclosed volume of space larger than a volume of space occupied by the speaker and acoustically coupled to the second side of the sound-radiating element of the speaker, the enclosure sized to fit within a first vertically-oriented cavity in a seat back, open at the top of the seat back. A motor moves the first speaker enclosure between a first position in which the first speaker enclosure is fully contained within the first cavity and a second position in which the first speaker enclosure protrudes from the top of the seat back such that the first side of the sound-radiating element is coupled to free space at the top of the seat back.

18 Claims, 7 Drawing Sheets

(56) References Cited

U.S. PATENT DOCUMENTS

| | | |
|---|---|---|
| 7,424,127 B1 | 9/2008 | Holmi et al. |
| 7,450,733 B2 * | 11/2008 | Suprapmo et al. ............ 381/337 |
| 7,684,577 B2 * | 3/2010 | Arai et al. .................... 381/302 |
| 7,899,198 B2 | 3/2011 | Holmi et al. |
| 8,000,484 B2 * | 8/2011 | Rasmussen ................... 381/301 |
| 8,050,420 B2 * | 11/2011 | Close et al. .................... 381/87 |
| 8,098,875 B2 | 1/2012 | Holmi et al. |
| 8,295,535 B2 * | 10/2012 | Tracy ............................ 381/389 |
| 8,325,938 B2 * | 12/2012 | Yokota ............................ 381/93 |
| 2004/0156517 A1 * | 8/2004 | Schmidt et al. ............... 381/334 |
| 2007/0058824 A1 * | 3/2007 | Aylward et al. ............... 381/152 |
| 2008/0315653 A1 | 12/2008 | Brunner et al. |
| 2009/0196432 A1 | 8/2009 | Close et al. |
| 2010/0148550 A1 * | 6/2010 | Kidd .......................... 297/217.4 |

FOREIGN PATENT DOCUMENTS

| | | |
|---|---|---|
| EP | 1763281 A2 | 3/2007 |
| EP | 2495993 A1 | 9/2012 |
| JP | 2008173998 A | 7/2008 |
| WO | 96/31105 | 10/1996 |

* cited by examiner

PROVIDING SPEAKERS IN A VEHICLE SEAT

BACKGROUND

This disclosure relates to providing speakers in a vehicle seat.

U.S. Pat. No. 7,424,127, the entire contents of which are hereby incorporated by reference, describes certain benefits of locating electroacoustic transducers, i.e., speakers, in the seatback or headrest of a vehicle seat, near the ears of the driver or passenger.

SUMMARY

In general, in one aspect, a seat includes a seat back having a first vertically-oriented cavity open at the top of the seat back. A first speaker enclosure includes a speaker having a sound-radiating element with a first side and a second side, and an at least partially enclosed volume of space larger than a volume of space occupied by the speaker and acoustically coupled to the second side of the sound-radiating element of the speaker. The enclosure is sized to fit within the first cavity. A motor is coupled to the first speaker enclosure and operable to move the first speaker enclosure between a first position in which the first speaker enclosure is fully contained within the first cavity and a second position in which the first speaker enclosure protrudes from the top of the seat back such that the first side of the sound-radiating element is coupled to free space at the top of the seat back.

Implementations may include one or more of the following. A second speaker enclosure may be sized to fit within a second vertically-oriented cavity in the seat back. A headrest may be included, with the first and second cavities positioned such that when the first and second speaker enclosures protrude from the top of the seat back, they are positioned to either side of the headrest. When the first and second speaker enclosures protrude from the top of the seat back, they are directly adjacent to corresponding sides of the headrest. The motor may also be coupled to the second speaker enclosure and operable to move the second speaker enclosure between a first position in which the second speaker enclosure may be fully contained within the second cavity and a second position in which the second speaker enclosure protrudes from the top of the seat back. A second motor may be coupled to the second speaker enclosure and operable to move the second speaker enclosure between a first position in which the second speaker enclosure is fully contained within the second cavity and a second position in which the second speaker enclosure protrudes from the top of the seat back.

A headrest may includes a vertically-oriented shaft that protrudes into the seat back and supports the headrest in at least two vertical positions, with the first speaker enclosure including a protrusion extending from the enclosure and aligned with the shaft of the headrest, such that the protrusion limits the upper vertical extent of the second position of the first speaker enclosure according to the position of the headrest. The motor may be a rotary motor coupled by a rotary-to-linear linkage to the first enclosure; when the motor is engaged in a first operating mode, it moves the first speaker enclosure from the first position to the second position, and when the motor is engaged in a second operating mode, it moves the first speaker enclosure from the second position to the first position. The rotary-to-linear linkage includes a screw. The rotary-to-linear linkage includes a cable assembly. A passive retractor may be coupled to the first speaker enclosure, such that when the motor is not energized, the passive retractor moves the first speaker enclosure from the second position to the first position, if it is not already in the first position, and retains the speaker enclosure in the first position. The passive retractor includes a spring, such that the spring is extended when the first speaker enclosure is in the second position, and retraction of the spring pulls the speaker enclosure towards the first position. The motor and the passive retractor together include a linear motor having an actuator that moves from a rest position to an extended position when the motor is energized, and returns to the rest position when the motor is not energized. The actuator is coupled to the first speaker enclosure to position the first speaker enclosure in the first position when the actuator is in the rest position and to position the first speaker enclosure in the second position when the actuator may is in the extended position.

A controller has a signal input and causes the first speaker enclosure to be moved to and be retained in the first position in response to receiving a signal on the signal input. The controller causes the motor to move the first speaker enclosure to the first position by energizing the motor in an operating mode that so moves the first speaker enclosure. The controller causes the first speaker enclosure to be moved to and retained in the first position by de-energizing the motor and thereby allowing a passive retractor to move the first speaker enclosure to the first position and retain it in the first position. The signal input may be an activation signal of an active safety system. The first speaker enclosure may be moved to and retained in the first position when the seat is folded. The speaker includes an audio signal input, and the motor may be coupled to the audio signal input, such that when a signal is present on the audio signal input, the motor is energized to move the first speaker enclosure to the second position.

The first speaker enclosure may be open at a lower end, such that when the first speaker enclosure is in the second position, a volume of the space vacated by the enclosure is combined with the volume enclosed by the enclosure to enclose a larger volume than the enclosure alone. A seal may be present between the enclosure and the void, such that the volume of air enclosed by the enclosure and void in cooperation is sealed against leaks. The enclosure may be separated from the void by a controlled distance, such that the volume of air enclosed by the enclosure and void in cooperation is coupled to free space above the seatback by a gap between the enclosure and the void. The void may extend to an opening in the seatback distant from the opening at the top where the enclosure protrudes. The speaker may be located at a position within the first speaker enclosure distant from the top of the enclosure, and the first side of the sound-radiating element may be coupled to free space through an upper volume within the enclosure and an opening at the top of the enclosure. The speaker may be located at a position within the first speaker enclosure distant from the top of the enclosure, and the first side of the sound-radiating element may be coupled to free space through an upper volume within the enclosure and a passive radiator at the top of the enclosure. The first speaker enclosure may include a second speaker, the two speakers together forming a speaker array.

In general, in one aspect, a speaker system for use in a seat includes a speaker enclosure including a speaker having a sound-radiating element with a first side and a second side, and an at least partially enclosed volume of space larger than a volume of space occupied by the speaker and acoustically coupled to the second side of the sound-radiating element of the speaker, the enclosure sized to fit within a first vertically-oriented cavity in a seat back, open at the top of the seat back. A motor is coupled to the first speaker enclosure and operable to move the first speaker enclosure between a first position in which the first speaker enclosure is fully contained within the first cavity and a second position in which the first speaker enclosure protrudes from the top of the seat back such that the first side of the sound-radiating element is coupled to free space at the top of the seat back.

Advantages include providing loudspeakers near the ears of a driver or passenger without interfering with the aesthetic or safety aspects of the headrest.

All examples and features mentioned above can be combined in any technically possible way. Other features and advantages will be apparent from the description and the claims.

DESCRIPTION

There are significant benefits to locating speakers near the ears of a passenger in a vehicle, such as integrated into the headrest or the seatback, but there are also significant limitations on doing so. In some vehicles, the headrests are narrow, and adding speakers at an appropriate distance from each other would extend beyond the width of the headrests, spoiling the intended aesthetics of the narrow headrest. Even if the headrests are wide enough to provide the desired spacing, safety and structural concerns may prevent packaging the speakers in the headrest itself, or may not provide enough empty volume for the speakers to perform as desired. Locating the speakers in the seatback, and using motors to raise them into position when needed, provides the required acoustic volume and speaker location for desired performance, while allowing the speakers to hide away when the system is not in use, preserving or enhancing the desired aesthetics of the seat.

Figure 1A:
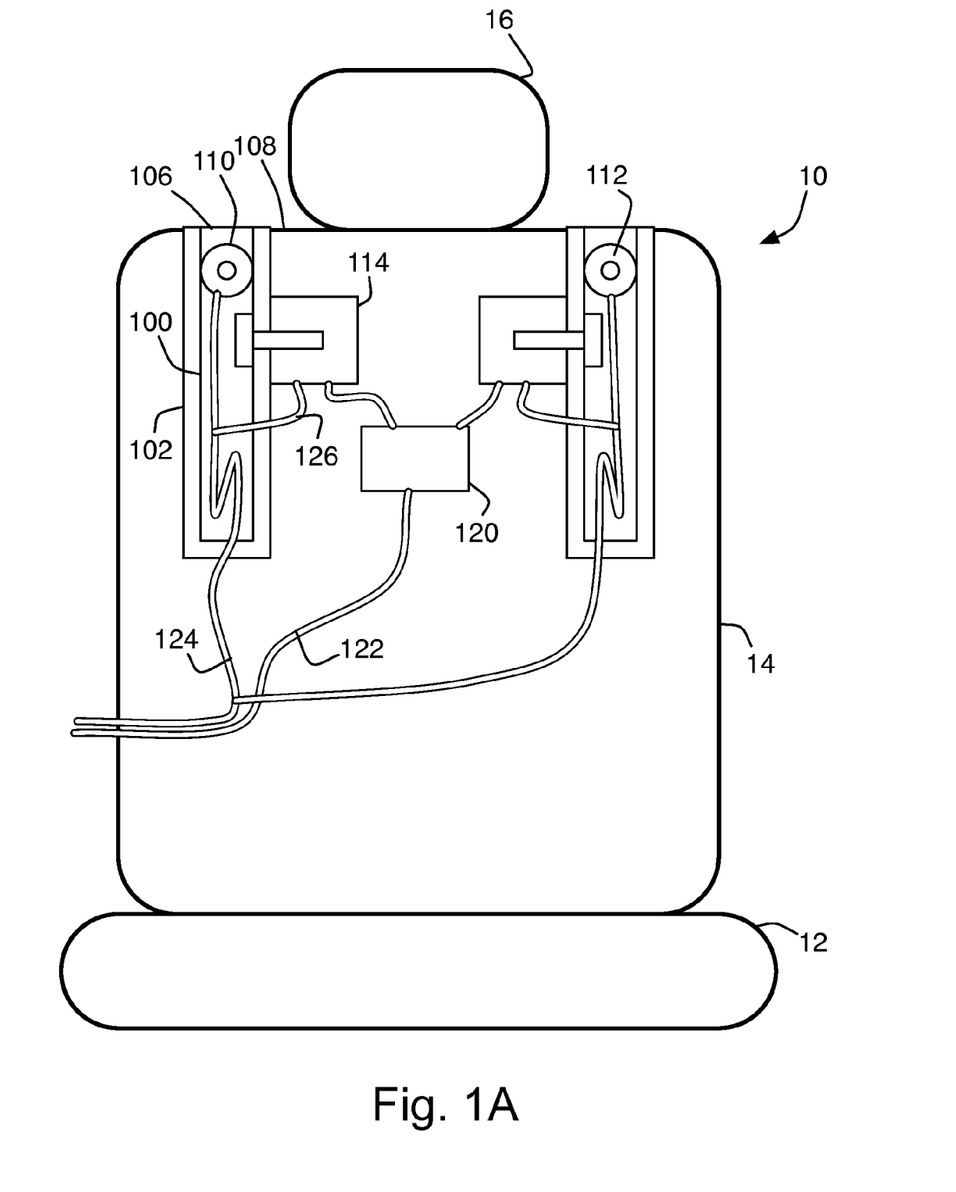
FIG. 1A shows speaker enclosures in a seatback in a retracted position.
Figure 1B:
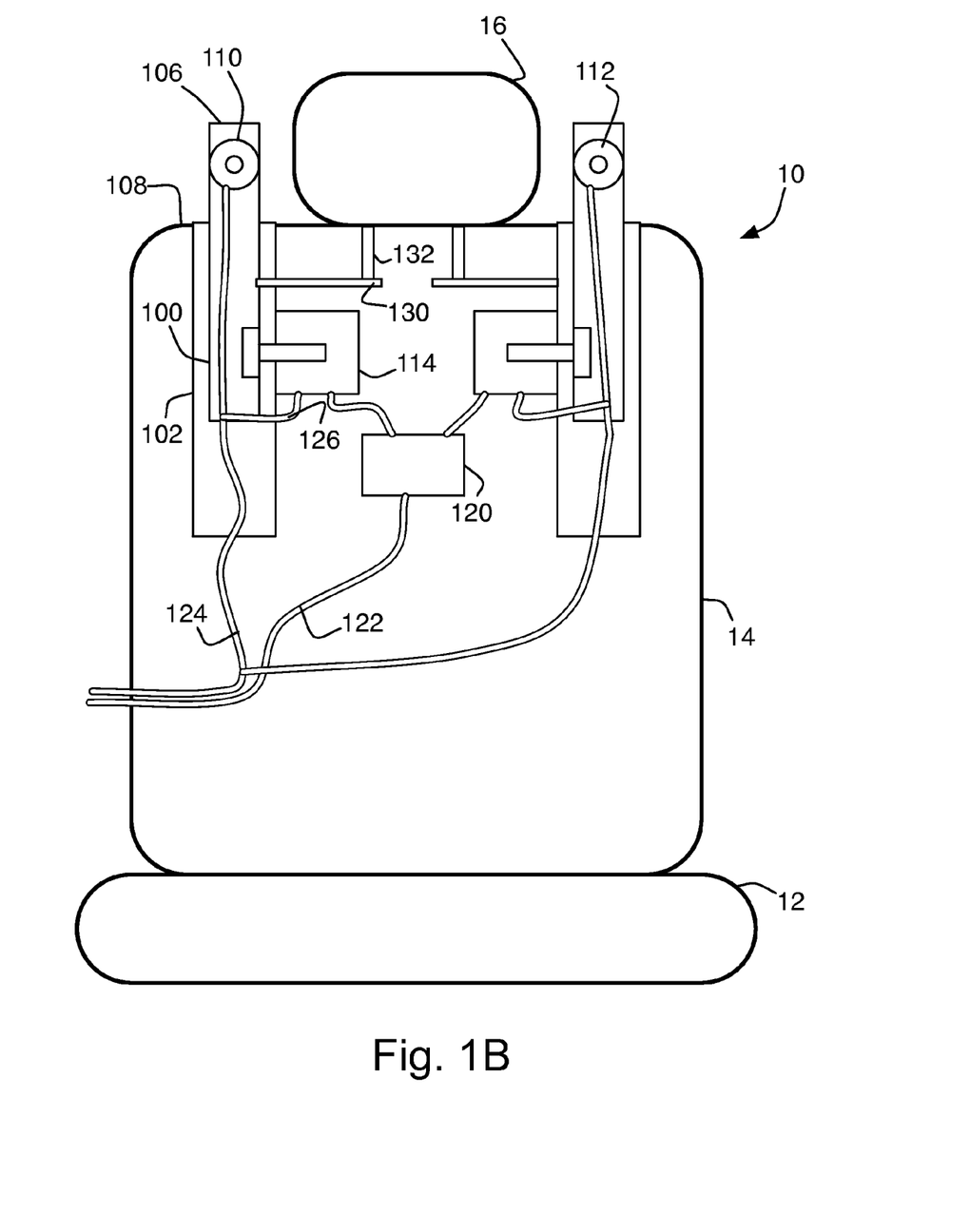
FIG. 1B shows the speaker enclosures of FIG. 1A in an extended position.

As shown in FIGS. 1A and 1B, a typical automobile seat 10 includes a seat base 12, a seatback 14, and a headrest 16. In some examples, two or all three of the seat base, seatback, and headrest may be integrated rather than discrete sections. According to the present disclosure, tube-shaped speaker enclosures 100 are housed in corresponding voids 102 in the sides of the seatback 14 (items that are duplicated on the right and left are only labeled once). In FIG. 1A, the enclosures 100 are shown in their retracted positions, such that the top ends 106 of the enclosures are flush with the top surface 108 of the seatback, and the speakers 110 are hidden inside the seat. In FIG. 1B, the enclosures 100 are shown in their extended positions, such that the outward radiating surfaces 112 of the speakers 110 are exposed to the environment in the vicinity of the passenger's head. One or more motors 114 are used to move the enclosures between the retracted and extended positions. The enclosures are positioned so that, when extended, the speakers are located to either side of the headrest. If not for the presence of the headrest itself, it would be desirable for the speakers to be rather close together to provide optimal acoustic performance at the ears of a person sitting in the seat. Given the constraints of the headrest, it may desirable that the speakers be as close to the headrest as they can be while still allowing both the speakers and the headrest to move freely. The headrest is connected to structures inside the seat, between the enclosures, and may be continuous with the seat structure or a separate part.

In addition to being close to the sides of the headrest, it is also desirable that the speakers be vertically aligned with the ears of the person sitting in the seat. One way to provide for such alignment is to use the vertical position of the headrest to control the height to which the speakers extend from the seat back. As shown in FIG. 1b, a tab 130 extending from the side of each enclosure 100 contacts the end of a shaft 132 supporting the headrest, stopping further upward motion of the enclosure 100. When the headrest is raised or lowered to be in the proper position for a given user, the end of the support shaft will be correspondingly raised or lowered, and will then control the vertical position of the enclosure to match the vertical position of the headrest. While this still depends on determining a headrest position to enclosure position relationship that will fit the best proportion of the population, it provides more flexibility than simply selecting a single enclosure position for all users.

The enclosures may be moved between the extended and retracted positions at a few different points in time. In some examples, they are extended whenever the audio system is operating. This might be implemented through an active controller 120, that activates the motor upon receiving an instruction from the audio system over a control line 122. In other examples, the enclosures are extended only when the audio system is in a mode geared towards the use of speakers near the front-seat passengers' heads, and are retracted in other modes, such as a rear-seat focused mode. Of course, such retractable enclosures may also be provided in the rear seat, and might be used to provide far-field sound effects for front-seat passengers, or might only be extended when weight sensors or other settings indicate the presence of passengers in the rear seat. In another example, the motor may simply be powered or triggered by audio signals sent to the speaker on a signal line 124, via a tap 126, such that the motor is caused to raise the enclosures by the audio signal itself. An audio signal will not generally have enough power to drive a motor, but it may be used to trigger a relay that couples an appropriate power supply to the motor. Wiring of the control and signal lines, as well as power for the motor, into the seat may be provided in a common wiring bundle with wires for other electronics in the seat, such as seat position motors, heaters, weight sensors, and airbag controls.

As described below, the enclosures may be designed with a fail-safe mechanism that retracts the enclosures in the event of a loss of power. The speakers may be retracted, either under control of the motor or by intentionally activating the fail safe, based on conditions other than the operation of the audio system. For example, in a vehicle equipped with crash-detection sensors, signals sent out to prepare for or respond to an impact, such as by arming or firing airbags and activating seatbelt pretensioners or whip-lash protection systems, may also cause the retraction of the enclosures. In a car with folding seats (front or rear), a connection may be provided between the seat-folding controls and the enclosure positioning mechanism to assure that the enclosures are and remain retracted when the seats containing them are folded. This could be done actively under the control of the controller 120 (especially if the seat-folding system is powered), or passively by removing power to the motor when the seat is folded, thus engaging the fail-safe mechanism.

A variety of motor technologies may be used to move the enclosures between retracted and extended positions. In some examples, as shown abstractly in FIGS. 1A and 1B, a rotary motor with an appropriate rotary-to-linear linkage connecting it to the enclosures, or one such motor on each enclosure, is actively powered to move the enclosures between positions. Rotary-to-linear linkages include, for example, screws, belts, or cables. It is desirable that the two enclosures raise and lower together and to the same position. This may be controlled in various ways, including with linkages between the enclosures, use of a single motor with appropriate tolerances in the linkages to each enclosure, or using position feedback from each enclosure back to the motors to precisely servo the enclosure position.

Figure 2:
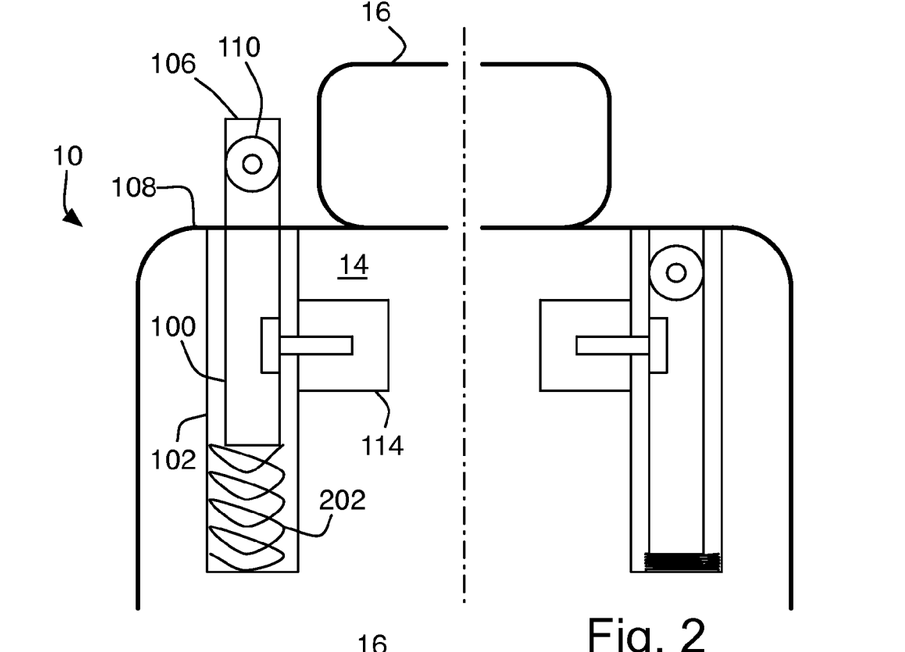
FIGS. 2, 3, and 4 show embodiments of mechanisms for moving the enclosures between positions.
Figure 3:
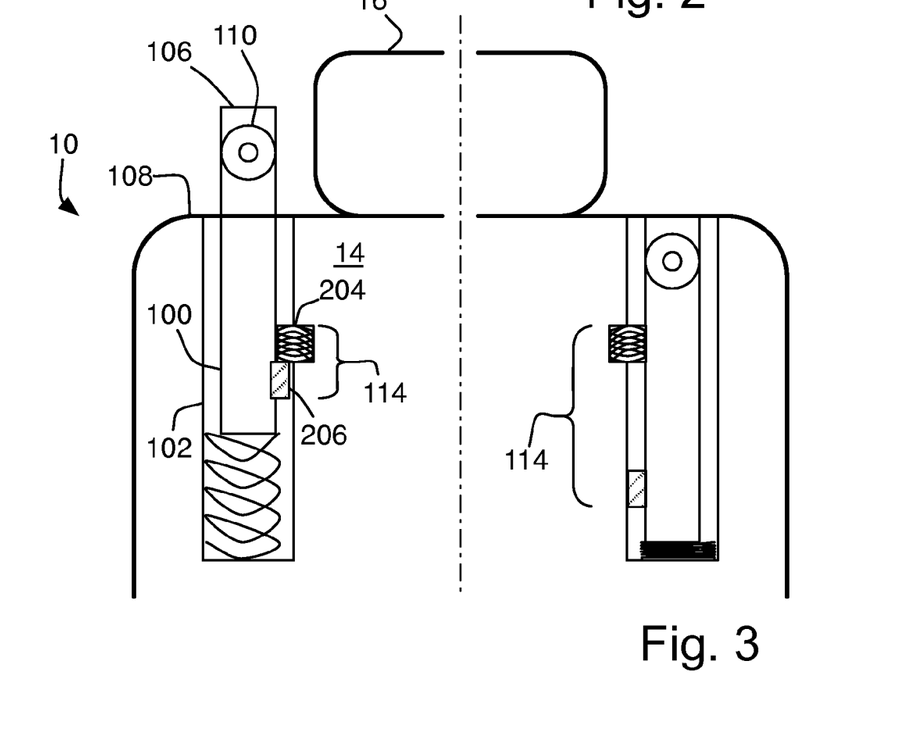

FIGS. 2 through 5 show several alternative example motor designs. These figures show half of the seat reflected around its center to show one enclosure extended and one retracted to illustrate the difference; in most applications, both enclosures will be retracted and extended simultaneously. In one example, as shown in FIG. 2, a passive element 202 such as a spring, permanent magnet, or simply gravity is used to hold the enclosures 100 in one position, such as retracted, and the motor 114 is used to overcome the passive element and move the enclosures to the other position. This may be used to provide a fail-safe feature, where the enclosures will automatically retract if there is a loss of power to the motor. When the enclosures are being retracted in normal operation, the degree to which the motor opposes the passive element may be gradually reduced to slowly lower the enclosures, while a loss of power causes the enclosures to rapidly retract under the influence of the passive element without opposition from the motor. In some examples, the motor may not even be a conventional "motor," but could simply be an electro-magnet 204 that attracts a metal component 206 of the enclosure when energized, and releases it when not energized, as shown in FIG. 3. For convenience, we refer to any electro-mechanical device used to control the position of the enclosures as a "motor."

Figure 4:
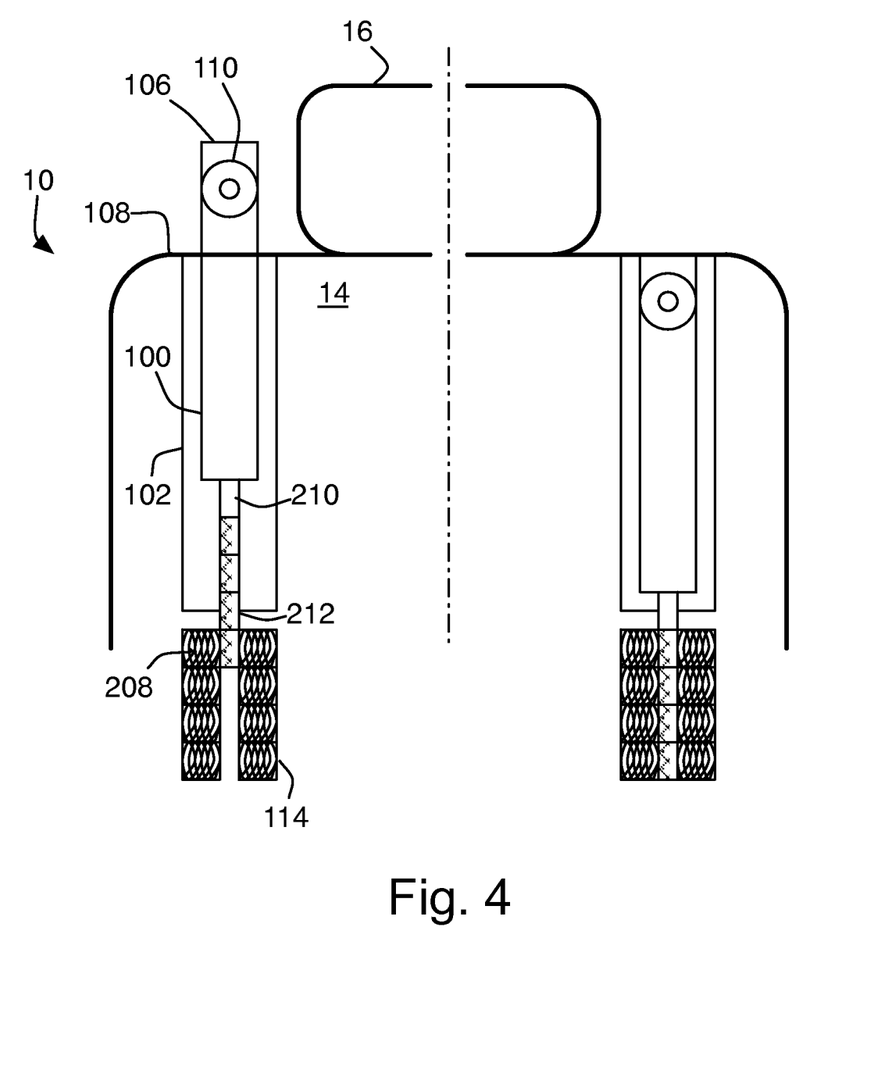

In some examples, active and passive elements may be combined. For example, as shown in FIG. 4, a linear motor is made of stationary coils 208 and a moving armature 210 with permanent magnets 212 on it. When the motor is not energized, the magnets are attracted to the coils and pull the armature into the motor, to a rest position, shown on the right. The armature may also be pulled to the rest position by a bearing flexure that also controls the motion of the armature to avoid crashing into the coils. See U.S. Pat. No. 7,679,229, incorporated here by reference. When the coils are energized, they repel the magnets, pushing the armature out to an extended position, raising the enclosures, shown on the left.

Figure 5:
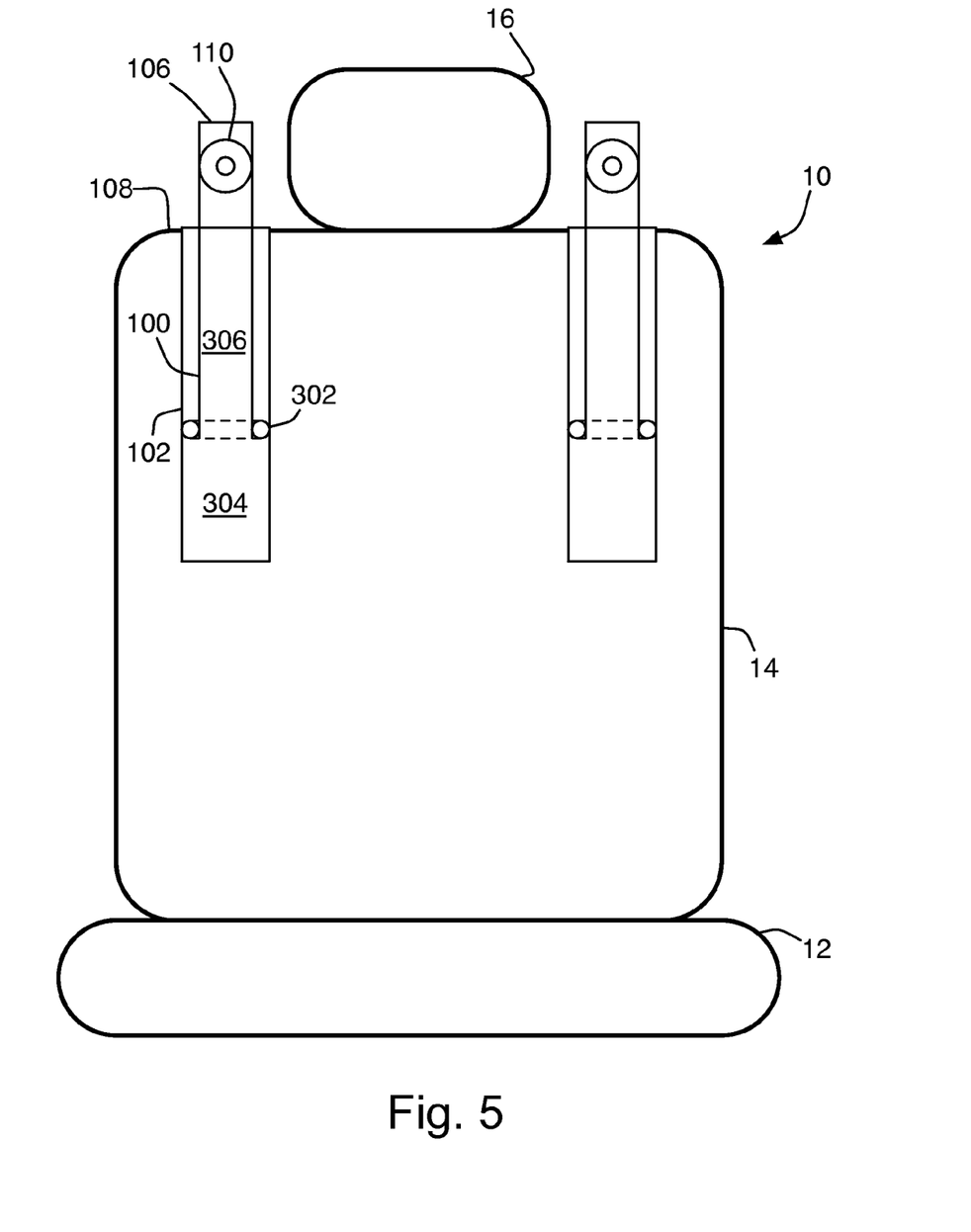
FIGS. 5, 6, and 7 show embodiments of the acoustic aspects of the enclosures.

The length and diameter or the enclosures provides an acoustic volume for the speakers behind the radiating surface (i.e., coupled to the back surface of the radiating element) of the speaker 110. By occupying space inside the seat, a greater acoustic volume is provided than would be available to self-contained speakers mounted on the tops of the seats or inside the headrests. In some examples, as shown in FIG. 5, the enclosures 100 are open at the bottom, and acoustically sealed to the walls of the voids 102 by a gasket 302 or other seal, so that when the enclosures are raised, the volume 304 of the void vacated by the rising enclosure is added to the volume 306 of the enclosure, increasing the total acoustic volume behind the speakers. In other examples, as shown in FIG. 6, the enclosures are again open at the bottom, but rather than a seal, a controlled gap 310 in maintained between the enclosures and the sides of the voids leading to an opening 312 around the enclosures at the top 108 of the seat, so that the total enclosed volume is the same as in FIG. 5, but the air in the enclosures and voids may exit the enclosed volume through the gap 310 between the sides of the voids and the enclosures and the opening 312, turning the gap into a bass-reflex port, and increasing the low-frequency performance of the speakers. A bass-reflex port 314 or other passive radiation member, such as a drone or waveguide, may also exit the void through the side, back, or bottom of the seat, as shown in FIG. 7.

Figure 6:
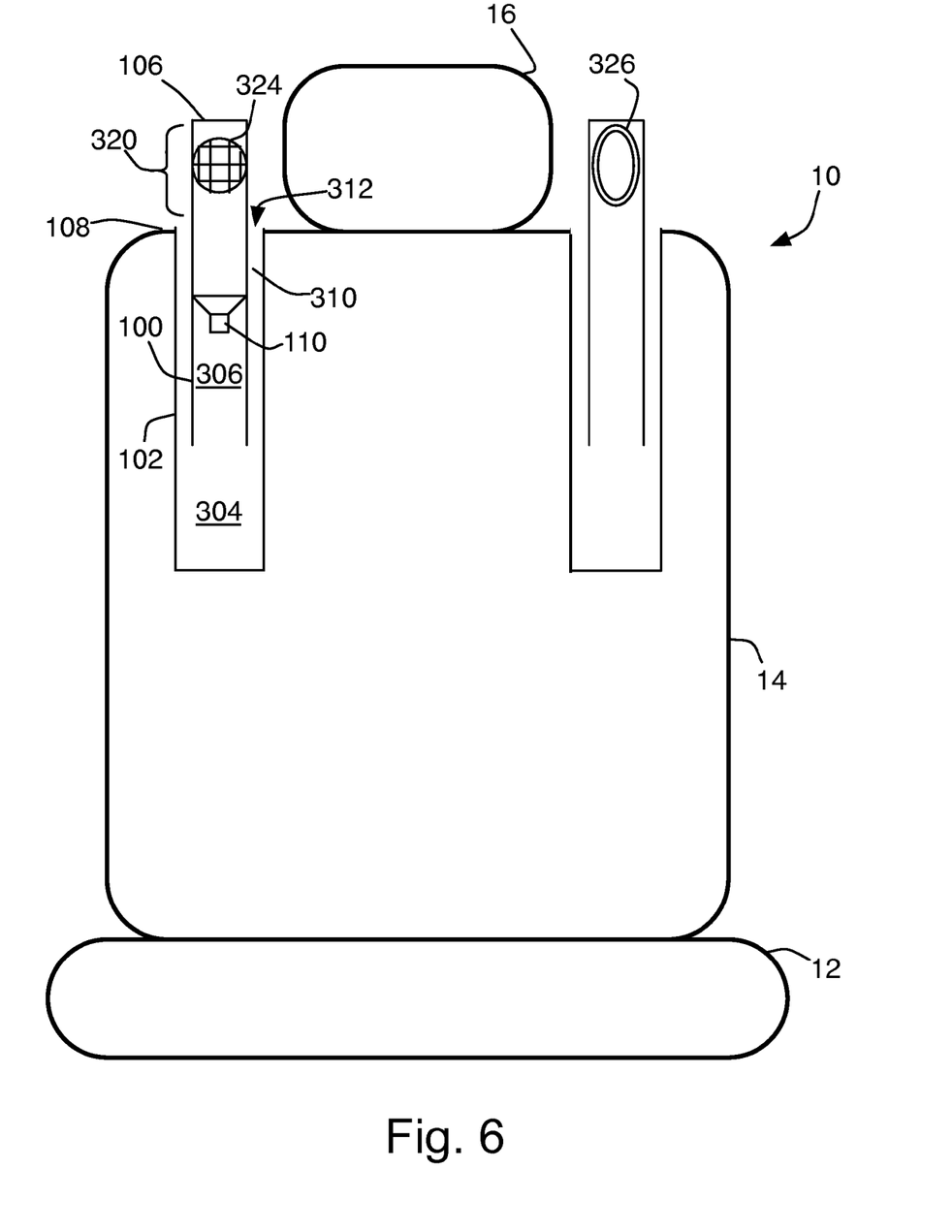
Figure 7:
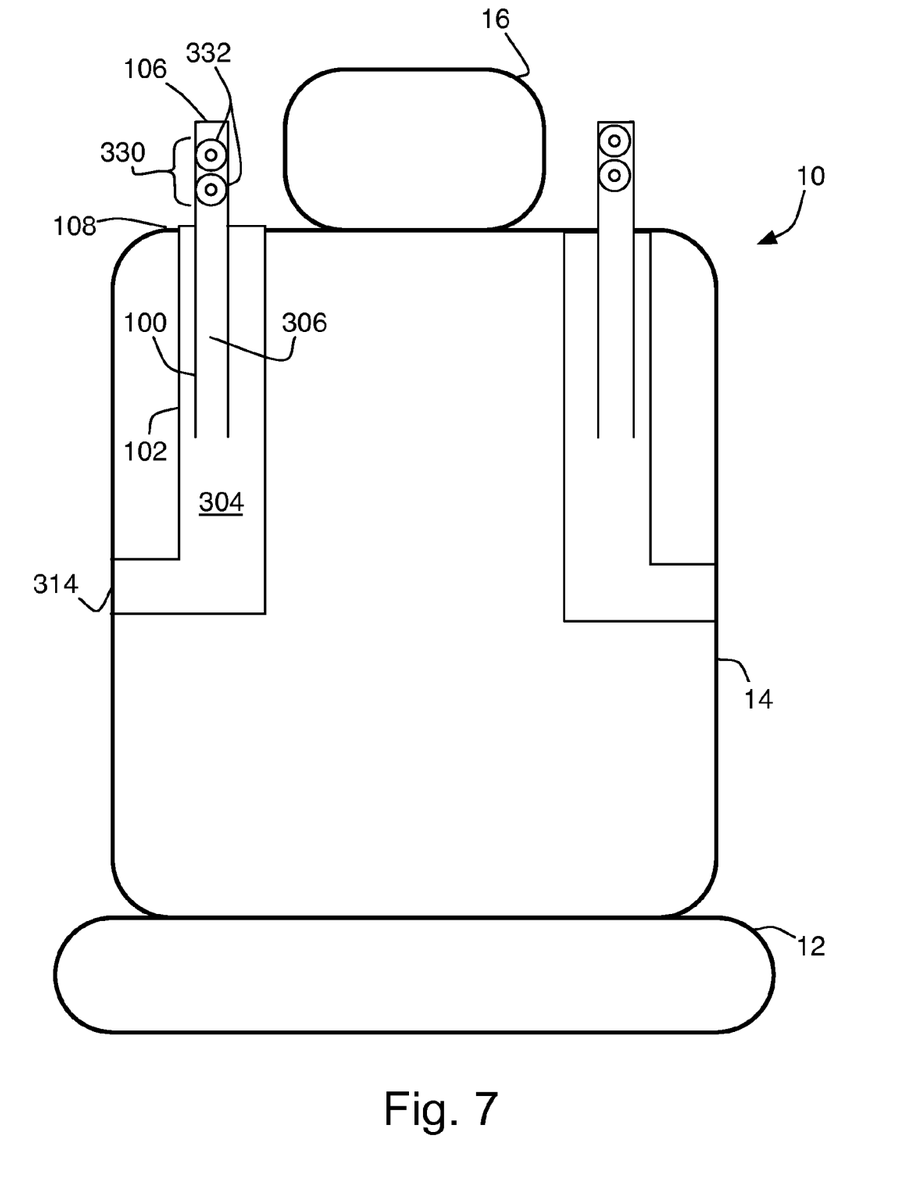

FIGS. 6 and 7 also show examples of other speaker designs and locations usable with any of the above enclosure variations. In some examples, as shown in FIG. 6, the speaker 110 is not located at the upper end of the enclosure 100, but is positioned lower down, so that it remains inside the seat back when the enclosure is raised, with an upper portion 320 of the enclosure ducting the sound from the speaker to the exposed end where it can be radiated. The radiating end of the enclosure may simply be an opening 324 at the end of the duct, which may be covered by a cosmetic and protective grille, or it could have a passive radiator 326 or other acoustic element covering it. In addition to potential acoustic benefits, positioning the speaker, which tends to be a heavy part, lower in the seat may improve the balance of the seatback, as opposed to locating it at the top. While FIG. 6 shows two different implementations on either side of the seat, in practice it is likely that any given seat will have two of the same implementation. In other examples, as shown in FIG. 7, an array 330 of small speakers 332 may be used. Such arrays may allow smaller-diameter speakers to be used, providing for a narrower enclosure. Arrays may also allow steering the direction in which the speakers radiate sound to better direct the sound energy to the passenger's ears, as described in U.S. Pat. No. 8,325,936, the entire contents of which are hereby incorporated by reference. In some examples, it is desirable that the speakers used be operable down to mid-low frequency ranges, e.g., operating down to between 100 and 200 Hz.

Other implementations are within the scope of the following claims and other claims to which the applicant may be entitled.

What is claimed is:

1. A seat comprising:
   a seat back having a first vertically-oriented cavity open at the top of the seat back;
   a first speaker enclosure comprising:
       a speaker having a sound-radiating element with a first side and a second side, and
       an at least partially enclosed volume of space larger than a volume of space occupied by the speaker and acoustically coupled to the second side of the sound-radiating element of the speaker,
       the enclosure sized to fit within the first cavity;
   a motor coupled to the first speaker enclosure and operable to move the first speaker enclosure between a first position in which the first speaker enclosure is fully contained within the first cavity and a second position in which the first speaker enclosure protrudes from the top of the seat back such that the first side of the sound-radiating element is coupled to free space at the top of the seat back; and
   a headrest, wherein:
   the headrest comprises a vertically-oriented shaft that protrudes into the seat back and supports the headrest in at least two vertical positions; and
   the first speaker enclosure further comprises a protrusion extending from the enclosure and aligned with the shaft of the headrest, such that the protrusion limits the upper vertical extent of the second position of the first speaker enclosure according to the position of the headrest.

2. The seat of claim 1, further comprising:
a second speaker enclosure sized to fit within a second vertically-oriented cavity in the seat back.

3. The seat of claim 2, further comprising a headrest;
wherein the first and second cavities are positioned such that when the first and second speaker enclosures protrude from the top of the seat back, they are positioned to either side of the headrest.

4. The seat of claim 3, wherein when the first and second speaker enclosures protrude from the top of the seat back, they are directly adjacent to corresponding sides of the headrest.

5. The seat of claim 2, wherein the motor is also coupled to the second speaker enclosure and is operable to move the second speaker enclosure between a first position in which the second speaker enclosure is fully contained within the second cavity and a second position in which the second speaker enclosure protrudes from the top of the seat back.

6. The seat of claim 2, further comprising a second motor coupled to the second speaker enclosure and operable to move the second speaker enclosure between a first position in which the second speaker enclosure is fully contained within the second cavity and a second position in which the second speaker enclosure protrudes from the top of the seat back.

7. The seat of claim 1, further comprising a controller having a signal input;
wherein the controller causes the first speaker enclosure to be moved to and be retained in the first position in response to receiving a signal on the signal input.

8. The seat of claim 7, wherein the controller causes the motor to move the first speaker enclosure to the first position by energizing the motor in an operating mode that so moves the first speaker enclosure.

9. The seat of claim 7, further comprising an active safety system, wherein the signal input is an activation signal of the active safety system.

10. The seat of claim 1, further comprising a mechanism that allows the seat to be folded, wherein the first speaker enclosure is moved to and retained in the first position when the seat is folded.

11. The seat of claim 1, wherein the first speaker enclosure is open at a lower end, such that when the first speaker enclosure is in the second position, a volume of the space vacated by the enclosure is combined with the volume enclosed by the enclosure to enclose a larger volume than the enclosure alone.

12. The seat of claim 11, further comprising a seal between the enclosure and the void, such that the volume of air enclosed by the enclosure and void in cooperation is sealed against leaks.

13. The seat of claim 11, wherein the enclosure is separated from the void by a controlled distance, such that the volume of air enclosed by the enclosure and void in cooperation is coupled to free space above the seatback by a gap between the enclosure and the void.

14. The seat of claim 11, wherein the void extends to an opening in the seatback distant from the opening at the top where the enclosure protrudes.

15. The seat of claim 1, wherein the speaker is located at a position within the first speaker enclosure distant from the top of the enclosure, and the first side of the sound-radiating element is coupled to free space through an upper volume within the enclosure and an opening at the top of the enclosure.

16. The seat of claim 1, wherein the speaker is located at a position within the first speaker enclosure distant from the top of the enclosure, and the first side of the sound-radiating element is coupled to free space through an upper volume within the enclosure and a passive radiator at the top of the enclosure.

17. The seat of claim 1, wherein the first speaker enclosure further comprises a second speaker, the speaker of claim 1 and the second speaker together forming a speaker array.

18. A seat comprising:
a seat back having a first vertically-oriented cavity open at the top of the seat back;
a first speaker enclosure comprising:
a speaker having a sound-radiating element with a first side and a second side, and
an at least partially enclosed volume of space larger than a volume of space occupied by the speaker and acoustically coupled to the second side of the sound-radiating element of the speaker,
the enclosure sized to fit within the first cavity; and
a motor coupled to the first speaker enclosure and operable to move the first speaker enclosure between a first position in which the first speaker enclosure is fully contained within the first cavity and a second position in which the first speaker enclosure protrudes from the top of the seat back such that the first side of the sound-radiating element is coupled to free space at the top of the seat back,
wherein the speaker comprises an audio signal input, and the motor is coupled to the audio signal input, such that when a signal is present on the audio signal input, the motor is energized to move the first speaker enclosure to the second position.

\* \* \* \* \*